United States Patent [19]
Andersson

[11] 3,932,575
[45] Jan. 13, 1976

[54] METHOD OF MAKING A MULTILAYERED PACKAGING TRAY BY DEEP-DRAWING

[76] Inventor: Sven Ingemar Andersson, Hollandaregatan 16, 271 00 Ystad, Sweden

[22] Filed: Mar. 19, 1974

[21] Appl. No.: 452,538

Related U.S. Application Data
[62] Division of Ser. No. 241,574, April 6, 1972, Pat. No. 3,834,606.

[52] U.S. Cl. ............... 264/154; 264/248; 264/292; 264/322
[51] Int. Cl.² ................... B29C 17/03; B65D 81/26
[58] Field of Search .......... 264/292, 322, 248, 156, 264/92, 154; 229/2.5, 3.1, 3.5 R, 14 R

[56] References Cited
UNITED STATES PATENTS

| | | | |
|---|---|---|---|
| 2,736,065 | 2/1956 | Wilcox | 264/292 |
| 3,264,120 | 8/1966 | Westcott | 229/2.5 |
| 3,511,428 | 5/1970 | Dilot | 229/3.1 |

FOREIGN PATENTS OR APPLICATIONS

| | | | |
|---|---|---|---|
| 331,254 | 12/1970 | Sweden | 229/2.5 |

Primary Examiner—Jan H. Silbaugh
Assistant Examiner—James B. Lowe
Attorney, Agent, or Firm—Holman & Stern

[57] ABSTRACT

A packaging tray provided with a bottom, side walls, and an outwardly directed flange surrounding the periphery of the side walls of the tray, consists of outer and inner layers of a moldable and stretchable synthetic plastic material, and intermediate layers of liquid-absorbing material with no or but insignificant stretchability. At the molding of the tray, the side walls thereof are formed by stretching of the plastic material and in a softening operation, an adhesive bond is realized between the outer and inner layers in the stretched tray side walls which thus present an at least partially ruptured intermediate layer.

2 Claims, 5 Drawing Figures

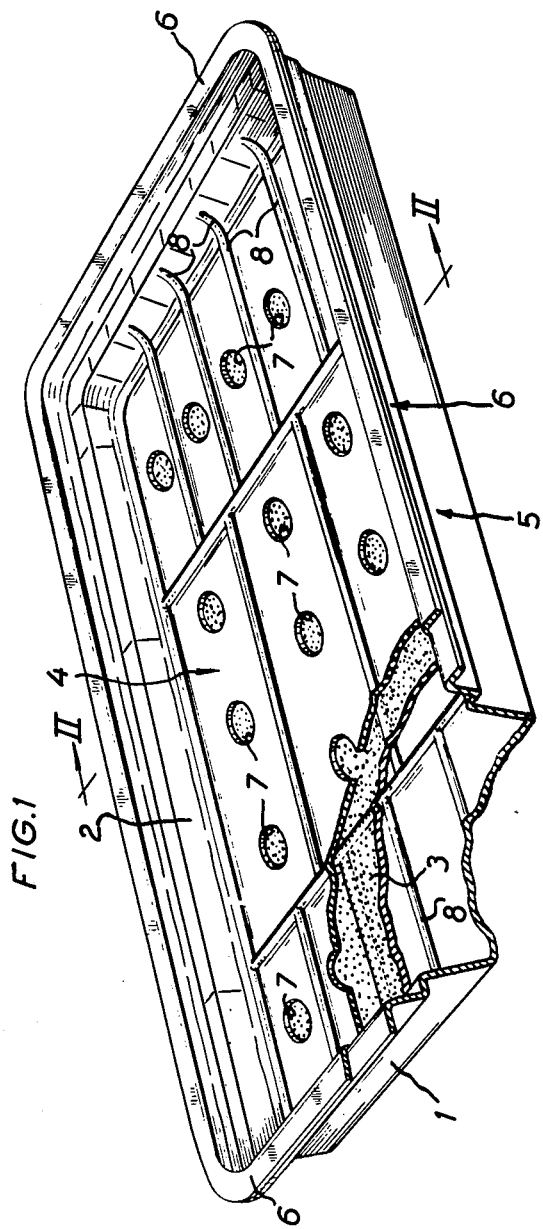

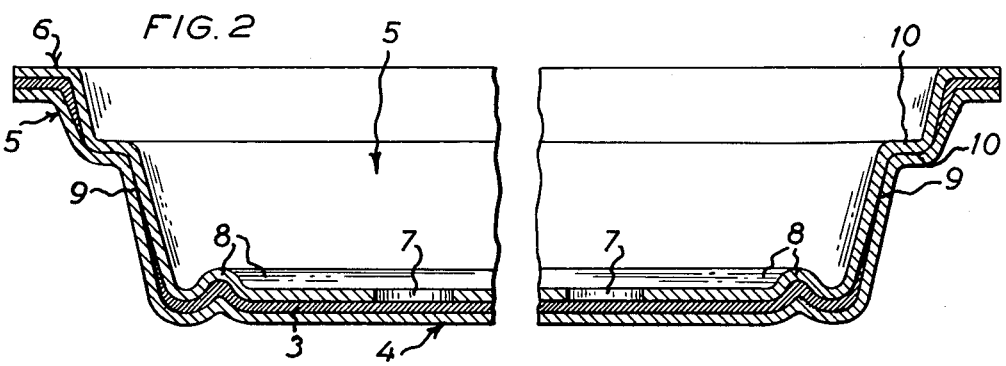
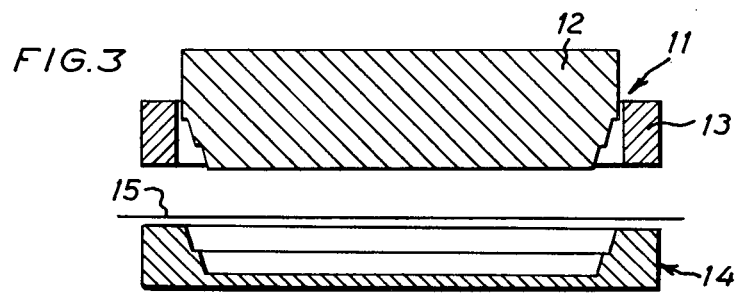
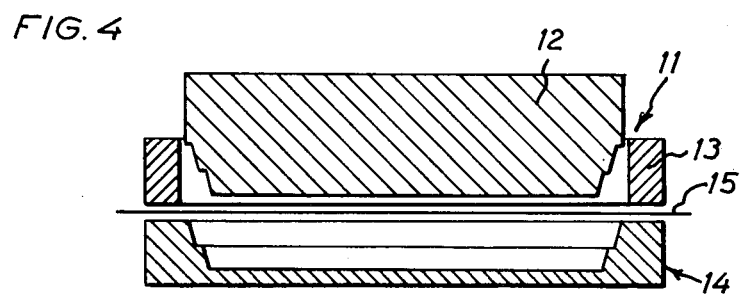
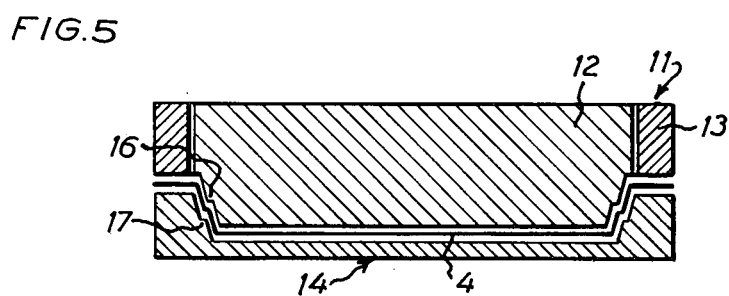

METHOD OF MAKING A MULTILAYERED PACKAGING TRAY BY DEEP-DRAWING

This is a divisional of application Ser. No. 241,574, filed Apr. 6, 1972 now U.S. Pat. No. 3,834,606 issued Sept. 10, 1974.

BACKGROUND OF THE INVENTION

This invention relates to a method of making a packaging tray which consists of outer and inner layers of initially flat blanks of a synthetic plastic material which is moldable when softened and thus stretchable, and intermediate layers of liquid-absorbing material having no or but insignificant stretchability, or in other words substantially non-stretchable said packaging tray having a bottom, side walls formed by stretching of the plastic material, and an outwardly directed flange extending around the rim of the tray.

PRIOR ART

In the manufacture of a prior art tray of this kind, webs of material representing the outer, inner and intermediate layers are brought together, while moving in the longitudinal direction, in a heating zone for softening the webs of plastic material disposed on opposite sides of the web of absorbing material, the webs are then molded into the shape of a tray and connected together, and finally the finished trays are separated from the webs.

When the tray is molded from the webs of material representing flat blanks for the trays, particularly the plastic material in the side walls is stretched and the intermediate layer of absorbing material cannot take part in such stretching. Therefore, the absorbing material will be retracted in a very irregular manner from the flange extending around the rim of the tray. The material will break in the flange and the side walls at indeterminate points which vary from one tray to the other. The result is a very weak and often non-existent connection between the outer and inner layers because the intermediate layer, by taking an indeterminate position in the flange and the side walls, prevents these layers from being regularly interconnected by welding. In the prior art tray, it has therefore been suggested to connect the outer and inner layers together by means of spot welds or continuous welds in the flange of the tray at the rim thereof. Because of the intermediate layer portions often prevailing in the flange, there will be formed a highly varied connection and in too many cases there will be no connection at all. Moreover, the connection presupposes that additional measures are taken, such as welding.

SUMMARY OF THE INVENTION

The present invention eliminates the disadvantages outlined in the foregoing by softening the outer and inner layers of the tray and realizing an adhesive bond between said layers in the stretched tray side walls which will thus have an at least partially ruptured intermediate layer. The side walls have substantially larger surfaces of contact between the layers than does the flange, for which reason the probability of an adhesive bond between the outer and inner layers in the side walls will be greater than in the flange. Moreover, the softening operation makes the layers tacky, which considerably facilitates the realization of the bond. The particular welding operation for establishing said bond is thus entirely eliminated. A reliable bond between the layers is ensured by forming the outer and inner layers of the side walls with interengaging folds which extend in the longitudinal direction of the side walls, and by the specific method of making the packaging tray.

The invention will be more fully described hereinbelow with reference to the accompanying drawings in which:

BRIEF DESCRIPTION OF THE INVENTION

FIG. 1 shows a perspective view and partial section of a packaging tray;

FIG. 2 is a section on line II—II in FIG. 1; and

FIGS. 3-5 illustrate the method of making the tray.

DETAILED DESCRIPTION OF THE INVENTION

The tray illustrated in the drawings comprises an outer cover layer 1 and an inner cover layer 2 of originally flat blanks made from plastic material which is moldable by softening and thus stretchable. The tray further comprises an intermediate layer 3 of liquid absorbing material which has no or but insignificant stretchability. In other words, the intermediate layer is of a substantially non-stretchable liquid absorbing material. The tray has a bottom 4, side walls 5 formed by stretching of the plastic material in the originally flat blank, and an outwardly directed flange 6 which extends around the rim or periphery of the tray. The inner layer 2 at the bottom of the tray is formed with holes 7. The bottom 4 of the tray has raised portions 8 which at least partially extend up into the side walls 5. For the interconnection of the outer and inner layers 1 and 2, there is brought about an adhesive bond 9 between said layers 1, 2 in the side walls 5 by softening said outer and inner layers, and the intermediate layer 3 in the side walls 5 at least partially ruptured when the plastic material is stretched in said side walls 5. In order to ensure a strong adhesive bond 9 between the layers 1, 2 in the side walls 5 under any circumstances, the side walls are formed with interengaging folds 10 which extend in the longitudinal direction of said side walls.

For the manufacture of the tray, webs of materials (not shown) representing the outer, inner and intermediate layers 1-3 are brought together, while moving in the longitudinal direction, in a heating zone to soften the webs of plastic material. The webs are then molded into the form of the tray and interconnected, after which the finished tray is separated from the webs. For practicing the method according to the invention, use is made of a combined press tool for the molding of the tray, which tool comprises, as will be seen from FIGS. 3-5, a punch 11 having an inner punch portion 12, an outer punch portion 13, and a die 14. The brought-together webs, or a flat blank 15 representing said webs, is introduced between the punch 11 and the die 14 in the initial position of the punch 11 in which it is raised from the die 14 (FIG. 3). The webs or the blank 15 comprising the three layers 1-3 are compressed and retained or in other words clamped in the area of the flange 6 by means of the punch outer portion 13 which is thus caused to move towards the die 14 before the inner punch portion 12 is operated. Then the inner punch portion 12 is moved towards the blank 15 while the outer punch portion 13 is held engaged with the blank 15, the bottom 4 and side walls 5 of the blank 15 being deep-drawn (FIG. 5). The deep drawing is performed in such a way that not all of the layers 1-3 in the bottom 4 of the tray are subjected to any appreciable deformation, while the plastic layers 1-3 in the side walls 5 are considerably deformed. This deformation implies that the layers 1, 2 are stretched while the intermediate layer 3 ruptures. The facing surfaces of the plastic layers 1, 2 in the side walls which have been exposed by the rupture of the intermediate layer 3 and are tacky because of the softening operation are compressed between the inner punch portion 12 and the die 14 and are securely bonded. Since all layers 1–3 are compressed between the outer punch portion 13 and the die 14 in the area of the flange 6 to be made, the intermediate layer 3 is retained in this area and will rupture only in the region of the side walls 5. The intermediate layer 3 in the bottom 4 of the tray will thus remain substantially unaffected. In order always to ensure a reliable bond between the outer and inner layers 1, 2, folds 10 are formed in both the outer and the inner layers with the aid of stepped sections 16, 17 on the inner punch portion 12 and the die 14, respectively. The folds 10 formed will engage with each other and will present surfaces extending in plane-parallel or largely plane-parallel relationship to the bottom of the tray, and the entire pressure of the inner punch portion 12 can assert itself on the die 14, whereby a reliable adhesive bond 9 is achieved between the layers 1, 2.

What I claim and desire to secure by Letters Patent is:

1. A method of making a packaging tray of a multi-layered wall material including an intermediate layer of a substantially non-stretchable liquid-absorbing material and, on each side of said intermediate layer, one cover layer of a synthetic plastic material which is moldable and stretchable when heat softened, said tray having a bottom, side walls and a flange extending outwardly from said side walls around the periphery of the tray, said method comprising the steps of forming the inside cover layer with perforations, heating the multilayered wall material to soften the cover layers of synthetic plastic material, clamping the wall material in the area of the flange to be produced, deep-drawing the non-clamped parts of the heated wall material inwardly of said clamped flange forming wall material area for forming the bottom and side walls of the tray with the bottom not being subject to appreciable stretching and the cover layers being compressed and bonded due to their tacky condition, forming in the tray side walls during said deep-drawing an offset extending around the tray and being substantially plane parallel with the bottom of the tray and, during said deep-drawing and offset-forming steps, stretching the wall material in the offset area of the tray to an extent sufficient to at least partially rupture the intermediate wall layer and to bring together the cover layers and heat seal said layers to each other.

2. A method of making a packaging tray having a multi-layered wall including an intermediate layer of a substantially non-stretchable liquid-absorbing material and, on each side of said intermediate layer, one cover layer of a synthetic plastic material which is moldable and stretchable when heat softened, said tray having a bottom, side walls and a flange extending outwardly from said side walls around the periphery of the tray, said method comprising the steps of forming the inside cover layer with perforations, bringing together webs for forming the cover and intermediate layers of the multi-layered wall, moving said webs into a heating zone, heating said webs in the heating zone for softening said cover webs of plastic material, clamping said heated webs in the area of the flange to be made, deep-drawing the non-clamped parts of the heated webs inwardly of said clamped flange-forming web area for forming the tray bottom and side walls, with the bottom not being subjected to appreciable stretching and the cover layers being compressed and bonded due to their tacky condition, forming in the tray side walls during said deep-drawing an offset extending around the tray and being substantially plane parallel with the bottom of the tray and, during said deep-drawing and offset-forming steps, stretching the webs in the offset area of the tray side walls to an extent sufficient to at least partially rupture the intermediate web layer and to bring together the cover web layers and heat seal such layers to each other, and separating the finished tray from the remaining parts of the webs.

* * * * *